United States Patent
Resh et al.

(10) Patent No.: US 10,415,580 B2
(45) Date of Patent: Sep. 17, 2019

(54) TORQUE CONVERTER IMPELLER INCLUDING IMPELLER SHELL HAVING THINNED SECTION

(71) Applicant: Schaeffler Technologies AG & Co. KG, Herzogenaurach (DE)

(72) Inventors: Michael Resh, Massillon, OH (US); David Burky, Jr., Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/913,388

(22) Filed: Mar. 6, 2018

(65) Prior Publication Data

US 2018/0195522 A1  Jul. 12, 2018

Related U.S. Application Data

(62) Division of application No. 14/482,804, filed on Sep. 10, 2014.

(60) Provisional application No. 61/876,843, filed on Sep. 12, 2013.

(51) Int. Cl.
  *F04D 29/18* (2006.01)
  *F16H 45/02* (2006.01)

(52) U.S. Cl.
  CPC .............. *F04D 29/18* (2013.01); *F16H 45/02* (2013.01); *F16H 2045/0205* (2013.01); *F16H 2045/0226* (2013.01); *F16H 2045/0278* (2013.01); *Y10T 29/4933* (2015.01)

(58) Field of Classification Search
  CPC .. F04D 29/18; F16H 45/02; F16H 2045/0278; F16H 2045/0205; F16H 2045/0226; Y10T 29/4933
  See application file for complete search history.

(56) References Cited

U.S. PATENT DOCUMENTS

| | | | | |
|---|---|---|---|---|
| 4,825,521 A | * | 5/1989 | Frotschner | F16H 41/28 228/162 |
| 6,406,262 B1 | * | 6/2002 | Kundermann | F16H 41/28 416/180 |
| 2008/0236975 A1 | * | 10/2008 | Frey | F16H 45/02 192/3.29 |
| 2012/0151907 A1 | | 6/2012 | Jimenez et al. | |

* cited by examiner

*Primary Examiner* — Ryan J. Walters
(74) *Attorney, Agent, or Firm* — Davidson, Davidson & Kappel, LLC

(57) ABSTRACT

An impeller for a torque converter is provided. The impeller includes an impeller shell including an inner circumference, an outer circumference and a radial extension extending radially outward from the inner circumference. The radial extension includes an axially extending groove formed therein. The impeller also includes an impeller hub welded to the impeller shell by a weld. The weld is radially inside of the axially extending groove. A method of forming an impeller for a torque converter is also provided.

18 Claims, 4 Drawing Sheets

TORQUE CONVERTER IMPELLER INCLUDING IMPELLER SHELL HAVING THINNED SECTION

This is a divisional of U.S. patent application Ser. No. 14/482,804, filed on Sep. 10, 2014, which claims the benefit to U.S. Provisional Patent Application No. 61/876,843, filed on Sep. 12, 2013, both of which are hereby incorporated by reference herein.

The present disclosure relates generally to torque converters and more specifically to impellers of torque converters.

BACKGROUND OF INVENTION

U.S. Pub. 2012/0151907 discloses method of connecting an impeller hub and impeller shell.

BRIEF SUMMARY OF THE INVENTION

An impeller for a torque converter is provided. The impeller includes an impeller shell including an inner circumference, an outer circumference and a radial extension extending radially outward from the inner circumference. The radial extension includes an axially extending groove formed therein. The impeller also includes an impeller hub welded to the impeller shell by a weld. The weld is radially inside of the axially extending groove.

A method of forming an impeller for a torque converter is provided. The method includes providing an impeller shell including an inner circumference, an outer circumference and a radial extension extending radially outward from the inner circumference; forming an axially extending groove in the radial extension; and welding an impeller hub to the impeller shell so as to form a weld on a back surface of the radial extension. The weld is radially inside of the axially extending groove.

BRIEF DESCRIPTION OF THE DRAWINGS

The present invention is described below by reference to the following drawings, in which:

FIG. 2b shows an enlarged view of a radial extension of the impeller shell as shown in the cross-sectional side view shown in FIG. 2a;

FIG. 3b shows an enlarged view of the radial extension of the impeller shell as shown in the cross-sectional side view shown in FIG. 3a.

DETAILED DESCRIPTION

One embodiment of the present invention includes an impeller shell having a particular radius formed therein that is then machined to create a flexible thinned section. Testing has shown that adding flexibility to the impeller shell may improve durability of the impeller hub weld. The impeller shell is thinned by machining the back side of the radius to form a bearing surface.

Figure 1:
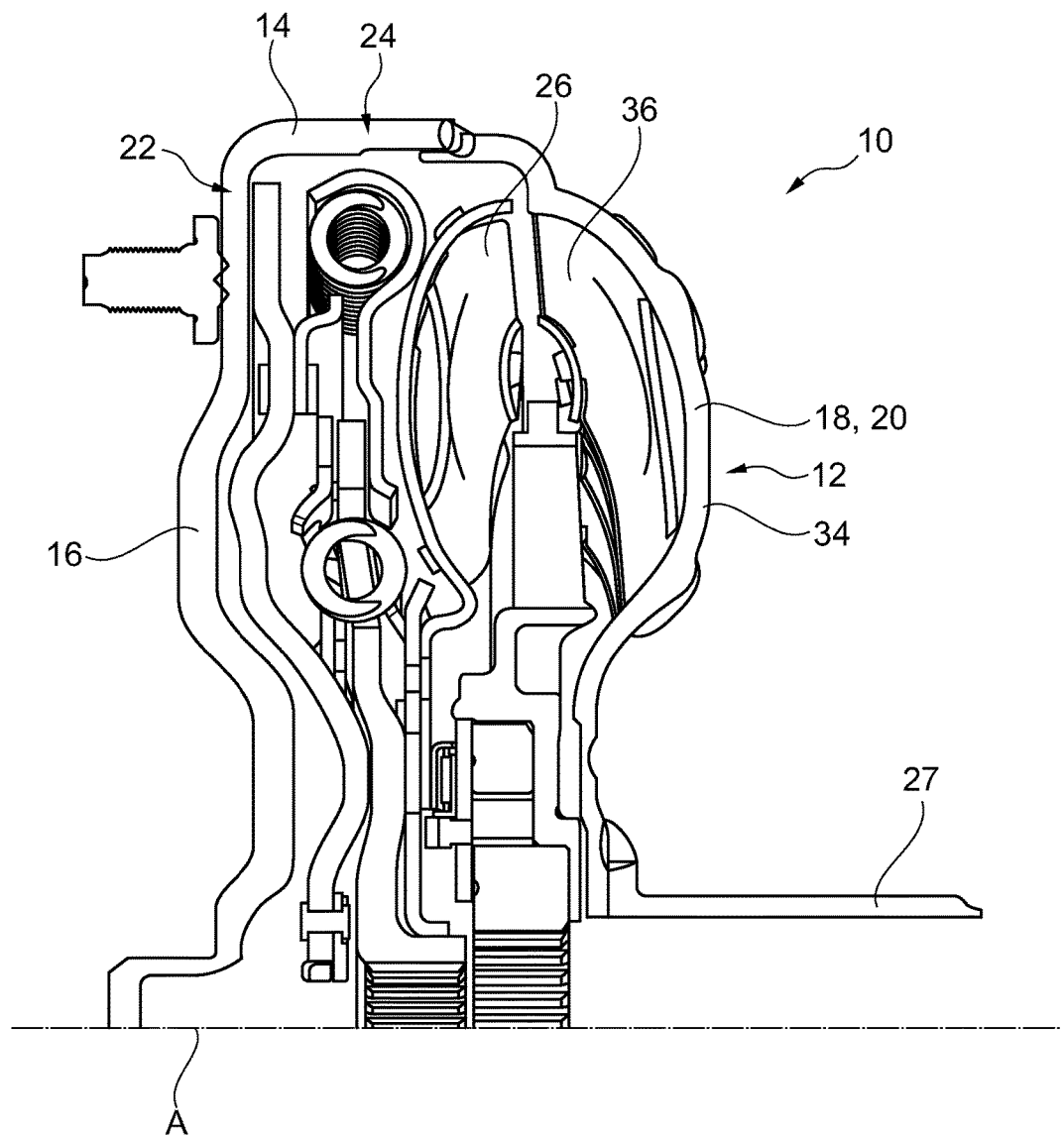
FIG. 1 shows a schematic cross-sectional side view of a torque converter including an impeller in accordance with an embodiment of the present invention.

FIG. 1 shows a schematic cross-sectional side view of a torque converter 10 including an impeller 12 in accordance with an embodiment of the present invention. Torque converter 10 includes a cover 14 including a front cover 16 and a rear cover 18, which is formed by an impeller shell 20 of impeller 12. Cover 14 houses a lockup clutch 22 and a damper 24, which are both schematically shown, and a turbine 26 opposite of impeller 12. Lockup clutch 22 engages with and disengages from front cover 16 and damper 24 couples turbine 26 to lockup clutch 22 such that turbine 26 is circumferentially driven with front cover 16 when lockup clutch 22 is engaged with front cover 16. Impeller 20 further includes an impeller hub 27 fixed to impeller shell 20 and impeller blades 36 supported by a rounded portion 34 of impeller shell 20.

Figure 2A:
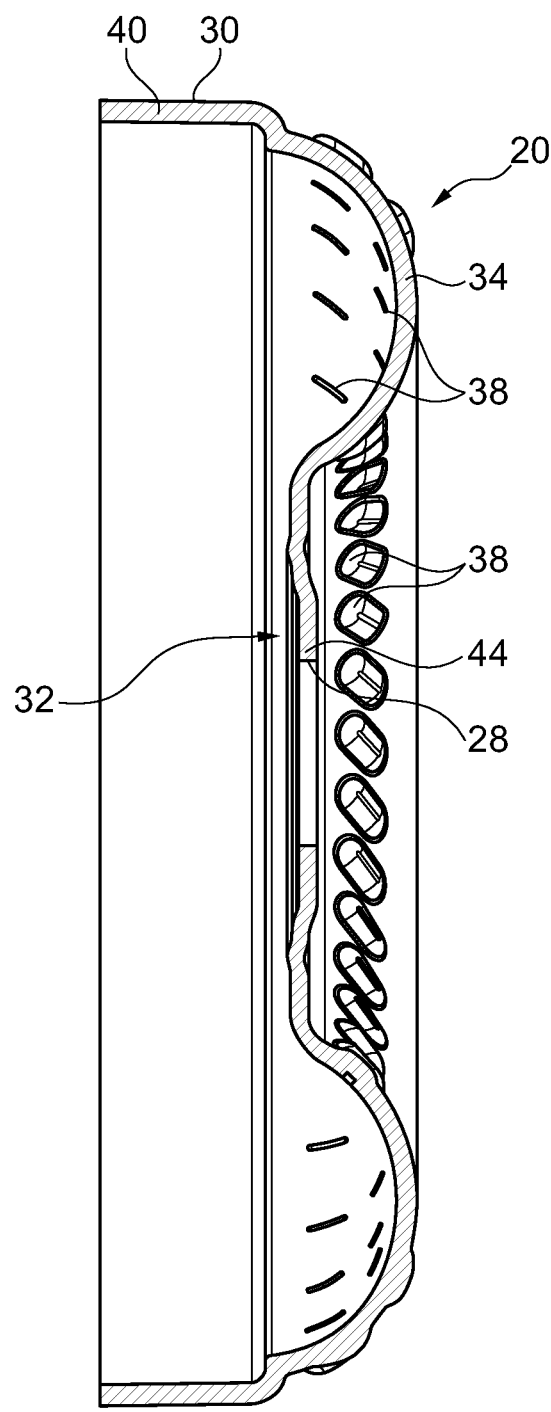
FIG. 2a shows a cross-sectional side view of an impeller shell of the impeller.

FIG. 2a shows a cross-sectional side view of impeller shell 20. Impeller shell 20 includes an inner circumference 28, an outer circumference 30 and a radial extension 32 extending radially from inner circumference 28. Impeller shell 20 includes a rounded portion 34 radially outside of radial extension 32. Rounded portion 34 is configured for supporting impeller blades 36 (FIGS. 1 and 3a) and includes a plurality of slots 38 formed therein for receiving blade tabs of impeller blades 36. Impeller shell 20 includes an axial extension 40 radially outside of rounded portion 34 for connecting to front cover 16 (FIG. 1). An outer radial surface of axial extension 40 defines outer circumference 30.

Figure 2B:
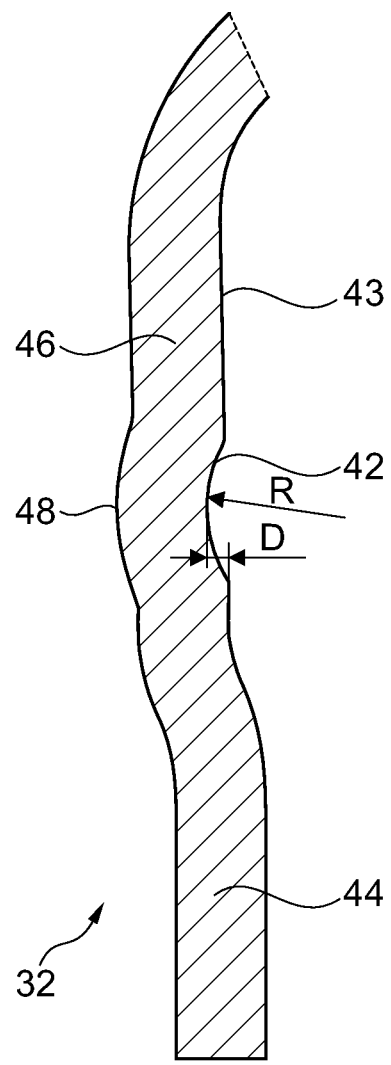
Figure 3A:
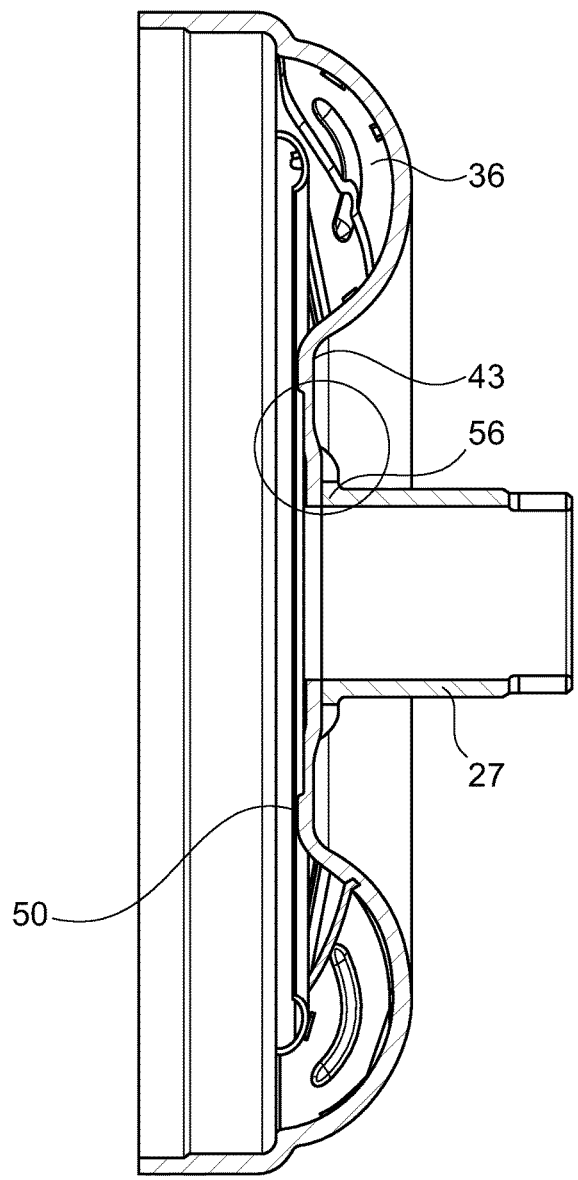
FIG. 3a shows a cross-sectional side view of the impeller after a front surface of impeller shell has been thinned.

FIG. 2b shows an enlarged view of radial extension 32 as shown in the cross-sectional side view shown in FIG. 2a. Radial extension 32 has an axially extending groove 42 formed in a back surface 43 of impeller shell 20 for adding flexibility to impeller shell 20. Axially extending groove 42 also extends circumferentially. In this preferred embodiment, axially extending groove 42 is formed during the stamping of impeller shell 20. In other embodiments, axially extending groove 42 may be machined or stamping into impeller shell 20 after impeller shell 20 has been formed by stamping. Radial extension 32 is substantially plate shaped and includes a flat inner radial portion 44 for connecting to impeller hub 27 (FIG. 3a). An inner radial surface of flat inner radial portion 44 defines inner circumference 28. Radially outward from flat inner radial portion 44, radial extension 32 protrudes slightly axially inward to form an intermediate portion 46. Intermediate portion 46 is substantially flat, except for axially extending groove 42 and an axial protrusion 48 on a front surface 50 of impeller shell 20 formed by material displaced during the stamping of axially extending groove 42. Axially extending groove 42 has a curved surface, which in this preferred embodiment has a radius of curvature R of at least 5 millimeters. Axially extending groove 42 has a depth D of approximately 0.8 millimeters.

Figure 2C:
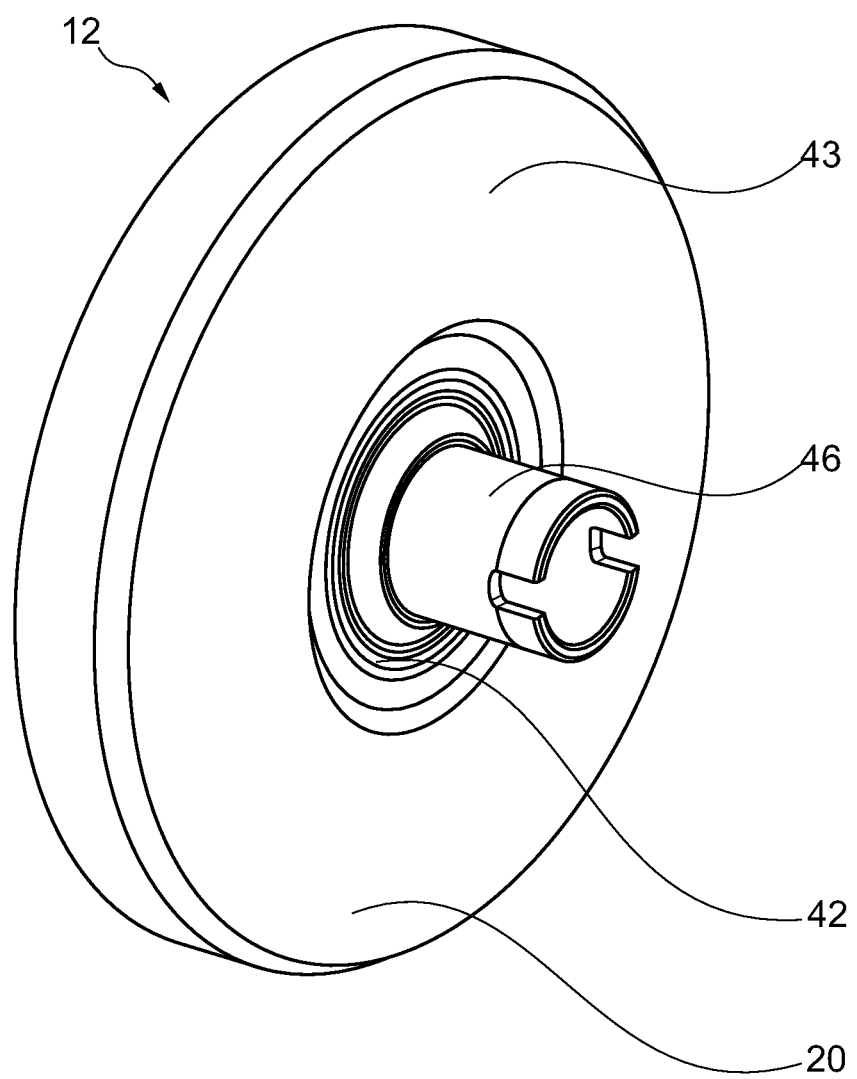
FIG. 2c shows a perspective view of a back surface of the impeller.

FIG. 2c shows a perspective view of the back surface 43 of impeller 12. As shown in FIG. 2c, axially extending groove 42 is ring shaped and extends continuously circumferentially around back surface 43.

Figure 3B:
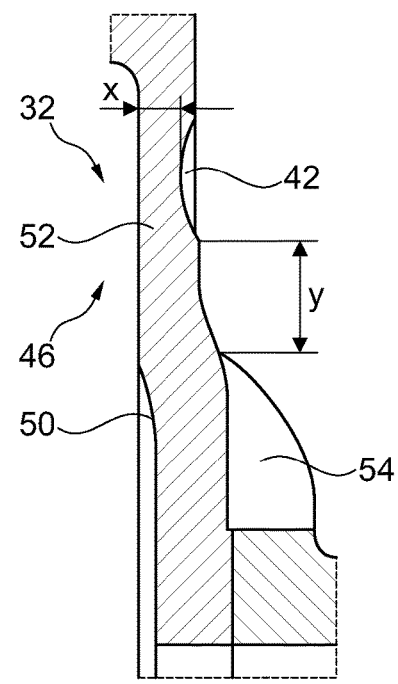

FIG. 3a shows a cross-sectional side view of impeller 12 after front surface 50 of impeller shell 20 has been thinned and FIG. 3b shows an enlarged view of radial extension 32 as shown in the cross-sectional side view shown in FIG. 3a. Specifically, front surface 50 has been machined at intermediate portion 46 to remove material from impeller shell 20 opposite of axially extending groove 42. As shown in FIG. 3b, after machining, intermediate portion 46 still protrudes slightly with respect to flat inner radial portion 44. In this preferred embodiment, the thickness X of impeller 20 at axially extending groove 42 is at least 1.7 millimeters after the thinning of front surface 50 of radial extension 32. After the machining, axial protrusion 48 has been removed and a machined portion 52 that is ring shaped and has a flat surface is formed. The machining adds further flexibility to impeller shell 20. As shown in FIG. 3*a*, rounded portion 34 supports a plurality of impeller blades 36.

Impeller hub 27 is welded to impeller shell 20 by a weld 54 extending circumferentially around impeller hub 27 at a front end 56 thereof. Front end 56 rests against back surface 43 of impeller shell 20. To add desired flexibility to impeller shell 20, axially extending groove 42 is spaced from weld 54 by a radial distance Y that is between 5 to 10 millimeters. Testing has shown that this adding of flexibility to the impeller shell 20 improves durability of impeller hub weld 54.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method of forming an impeller for a torque converter comprising:
    providing an impeller shell including an inner circumference, an outer circumference, a rounded portion configured for supporting a plurality of impeller blades and a radial extension extending radially inward from the rounded portion to the inner circumference;
    forming an axially extending groove in a back surface of a first portion of the radial extension, the axially extending groove extending from the back surface toward a front surface of the first portion; and
    welding an impeller hub to the impeller shell so as to form a weld on a back surface of a second portion of the radial extension, the second portion being radially inward of the first portion, the second portion being thicker at a location of the weld than the first portion, the first portion having a thickness measured from the front surface to the back surface.

2. The method as recited in claim 1 further comprising machining a front surface of the radial extension to thin the radial extension and form the first portion.

3. The method as recited in claim 1 wherein the second portion extends radially inward from the first portion to the inner circumference.

4. The method as recited in claim 1 wherein the second portion extends axially away from the first portion toward the impeller hub.

5. The method as recited in claim 4 wherein the front surface of the first portion is axially offset frontward from a front surface of the second portion.

6. The method as recited in claim 4 wherein the radial extension includes a third portion radially outward of the first portion, the third portion being thicker than the first portion.

7. The method as recited in claim 6 wherein a front surface of the third portion is axially offset frontward from a front surface of the second portion.

8. The method as recited in claim 1 wherein the forming the axially extending groove includes machining the axially extending groove into the radial extension.

9. The method as recited in claim 1 wherein the forming the axially extending groove includes stamping the axially extending groove into the radial extension.

10. The method as recited in claim 9 wherein the stamping the axially extending groove into the radial extension results in an axial protrusion on a front surface of the radial extension.

11. The method as recited in claim 10 further comprising machining the front surface of the radial extension to thin the radial extension and form the first portion, the thinning of the radial extension removing the axial protrusion.

12. The method as recited in claim 1 wherein the radial extension has a thickness of at least 1.7 millimeters at the axially extending groove.

13. The method as recited in claim 1 wherein the axially extending groove has a curved surface, the curved surface having a radius of curvature of at least 5 millimeters.

14. The method as recited in claim 1 wherein the axially extending groove is formed as a ring shaped groove extending circumferentially around the inner circumference.

15. The method as recited in claim 14 wherein the axially extending groove is greater than 5 millimeters from the weld.

16. The method as recited in claim 1 wherein the front surface of the first portion is flat and ring shaped.

17. A method of forming an impeller for a torque converter comprising:
    providing an impeller shell including an inner circumference, an outer circumference, a rounded portion configured for supporting a plurality of impeller blades and a radial extension extending radially inward from the rounded portion to the inner circumference;
    forming an axially extending groove in a back surface of a first portion of the radial extension, the forming the axially extending groove including stamping the axially extending groove into the radial extension, the stamping the axially extending groove into the radial extension resulting in an axial protrusion on a front surface of the radial extension;
    welding an impeller hub to the impeller shell so as to form a weld on a back surface of a second portion of the radial extension, the second portion being radially inward of the first portion, the second portion being thicker than the first portion, wherein thickness of the first portion is measured from the front surface to the back surface; and
    machining the front surface of the radial extension to thin the radial extension and form the first portion, the thinning of the radial extension removing the axial protrusion.

18. A method of forming an impeller for a torque converter comprising:
    providing an impeller shell including an inner circumference, an outer circumference, a rounded portion configured for supporting a plurality of impeller blades and a radial extension extending radially inward from the rounded portion to the inner circumference;
    forming an axially extending groove in a back surface of a first portion of the radial extension, the axially extending groove extending from the back surface toward a front surface of the first portion; and
    welding an impeller hub to the impeller shell so as to form a weld on a back surface of a second portion of the radial extension, the second portion being radially inward of the first portion, the front surface of the first portion being offset in a frontward direction from the back surface of the first portion, the front surface of the first portion being axially offset in the frontward direction from a front surface of the second portion at the location of the weld.

\* \* \* \* \*